(12) United States Patent
Xu et al.

(10) Patent No.: US 8,693,564 B2
(45) Date of Patent: Apr. 8, 2014

(54) LOW OVERHEAD FEEDBACK SCHEME FOR CODEBOOK BASED CLOSED-LOOP MIMO

(75) Inventors: Jian Xu, Anyang-si (KR); Ja Ho Koo, Anyang-si (KR); Bin Chul Ihm, Anyang-si (KR); Wook Bong Lee, Anyang-si (KR)

(73) Assignee: LG Electornics Inc., Seoul (KR)

( * ) Notice: Subject to any disclaimer, the term of this patent is extended or adjusted under 35 U.S.C. 154(b) by 232 days.

(21) Appl. No.: 13/141,207

(22) PCT Filed: Feb. 9, 2010

(86) PCT No.: PCT/KR2010/000790
§ 371 (c)(1),
(2), (4) Date: Aug. 30, 2011

(87) PCT Pub. No.: WO2010/147287
PCT Pub. Date: Dec. 23, 2010

(65) Prior Publication Data
US 2011/0299622 A1    Dec. 8, 2011

Related U.S. Application Data

(60) Provisional application No. 61/187,638, filed on Jun. 16, 2009.

(51) Int. Cl.
*H04B 7/02* (2006.01)
(52) U.S. Cl.
USPC ........... 375/267; 375/260; 375/261; 375/271; 375/295; 375/316
(58) Field of Classification Search
USPC ......... 375/260, 261, 267, 268, 271, 286, 295, 375/316, 322, 340, 346
See application file for complete search history.

(56) References Cited

U.S. PATENT DOCUMENTS

| 8,194,778 | B2 * | 6/2012 | Ko et al. ................ 375/267 |
| 8,432,785 | B2 * | 4/2013 | Van Nee et al. ........ 370/204 |
| 2006/0008021 | A1 * | 1/2006 | Bonnet .................. 375/267 |
| 2007/0097856 | A1 * | 5/2007 | Wang et al. ............ 370/210 |
| 2008/0298482 | A1 | 12/2008 | Rensburg et al. |
| 2009/0203335 | A1 * | 8/2009 | Lee et al. ............... 455/103 |

(Continued)

FOREIGN PATENT DOCUMENTS

KR    2008-0015352    2/2008

OTHER PUBLICATIONS

International Search Report from PCT/KR2010/000790 (PCT corresponding to present application).

*Primary Examiner* — Hirdepal Singh
(74) *Attorney, Agent, or Firm* — Morgan, Lewis & Bockius LLP

(57) ABSTRACT

The present invention relates to a Multi-Input Multi-Output (MIMO) communication system and more particularly, to a method for Correlation matrix feedback in a multi-cell wireless communication system. A method for transmitting correlation matrix feedback information of a mobile station considering adaptive feedback mode in a multi-cell wireless communication system according to one embodiment of the present invention comprises measuring a channel between the mobile station and a serving base station using a signal received from the serving base station; determining a first matrix indicating channel state information and a first precoder using the measured channel; generating a second matrix using a Fourier matrix and the first matrix; and transmitting feedback information including at least one of information of the first precoder and diagonal values of the second matrix.

18 Claims, 3 Drawing Sheets

(56) References Cited

U.S. PATENT DOCUMENTS

| | | | |
|---|---|---|---|
| 2010/0238984 A1* | 9/2010 | Sayana et al. | 375/219 |
| 2011/0216840 A1* | 9/2011 | Lee et al. | 375/259 |
| 2011/0305263 A1* | 12/2011 | Jöngren et al. | 375/219 |
| 2012/0128044 A1* | 5/2012 | Kim et al. | 375/219 |

* cited by examiner

LOW OVERHEAD FEEDBACK SCHEME FOR CODEBOOK BASED CLOSED-LOOP MIMO

The present application is a national stage of PCT International Application No. PCT/KR2010/000790 filed Feb. 9, 2010, and claims the benefit of U.S. Provisional Application No. 61/187,638, filed Jun. 16, 2009.

TECHNICAL FIELD

The present invention relates to a Multi-Input Multi-Output (MIMO) communication system and more particularly, to a method for Correlation matrix feedback in a multi-cell wireless communication system.

BACKGROUND ART

With the popularization of information communication services, the emergence of various multimedia services, and the provision of high-quality services, demand for a wireless communication service has rapidly increased. To actively cope with such demand, the capacity of a communication system should be increased and the reliability of data transmission should be improved.

To increase communication capacity in wireless communication environments, a method for newly searching available frequency bands and a method for increasing efficiency for limited resources may be considered. As to the latter method, a multiple-input multiple-output (MIMO) scheme has recently drawn attention and has been actively developed. The MIMO scheme obtains a diversity gain by equipping a transmitter and a receiver with a plurality of antennas to additionally ensure a spatial region for utilizing resources, or increases transmission capacity by transmitting data in parallel via the plurality of antennas.

Generally, the MIMO scheme is considered to raise the reliability of a communication system or to improve transmission efficiency and may be classified into beamforming, spatial diversity, and spatial multiplexing schemes.

The beamforming scheme and spatial diversity scheme, which use multiple transmit antennas to raise reliability, transmit a single data stream through multiple transmit antennas. The spatial multiplexing scheme, used to raise transmission efficiency, simultaneously transmits multiple data streams via multiple transmit antennas.

In the spatial multiplexing scheme, the number of simultaneously transmitted data streams is called a spatial multiplexing rate. The spatial multiplexing rate should be appropriately selected according to the number of transmit and receive antennas and to a channel state. Generally, the spatial multiplexing rate which can maximally be obtained is limited to a smaller value of the number of transmit antennas and the number of receive antennas. If correlation of a channel is increased, a low spatial multiplexing rate is used.

When employing the spatial multiplexing scheme, various gains can be obtained by applying a virtual antenna signaling scheme. For example, since channel environment of multiple data streams become the same by application of the virtual antenna signaling scheme, robust channel quality information (CQI) can be provided and the reliability of a data stream having a bad channel state can be increased.

Further, a transmit power of physical antennas to which a virtual antenna signaling scheme is applied can be nearly uniformly maintained. In more detail, sets of physical transmit antennas form a plurality of beams each corresponding to a virtual antenna. Different beams are generated not only to transmit the same power from all the physical antennas but also to reserve a channel characteristic.

The total number of virtual antennas determines an available spatial diversity or spatial multiplexing rate. Moreover, the total number of virtual antennas determines the amount of overhead required to measure space channels. Hereinbelow, the number of physical transmit antennas is denoted by Mr, the number of available virtual transmit antennas is denoted by Me, and the number of simultaneously transmitted layers is denoted by M. The layer indicates a transmission symbol which is independently coded and modulated for transmission.

Meanwhile, a precoding scheme refers to a spatial processing scheme to raise the reliability of a communication system and to improve transmission efficiency. The precoding scheme can be used irrespective of a spatial multiplexing rate in a multiple antenna system and increases a signal-to-noise ratio (SNR) of a channel. Examples of the precoding scheme include a codebook-based precoding scheme, which is used when feedback information is limited in a closed-loop system, and a scheme in which channel information is quantized and fed back. In the codebook-based precoding, the receiving end feeds an index of a precoding matrix, which is already known to both the receiving end and the transmitting end, back to the transmitting end to achieve an SNR gain.

In the 4th Generation wireless communication systems, MIMO schemes play a fundamental role in order to achieve high data rates in the downlink, for which CSI (Channel State Information or Channel State Indication) should be available at the transmitter (e.g., BS or eNB) by certain form of feedback. A correlation matrix feedback scheme is a good scheme of such form for single-cell or multi-cell rank 1 Closed-Loop MIMO.

In this case, transmitting whole elements constituting a correlation matrix as a feedback may cause a significant signaling overhead. Thus, a more efficient feedback scheme is required.

DISCLOSURE

Technical Problem

An object of the present invention is to provide a method of a correlation matrix feedback with low overhead.

Another object of the present invention is to provide a method of a correlation matrix feedback in adaptive feedback mode.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

To solve the aforementioned technical problems, according to one embodiment of the present invention, a method for transmitting correlation matrix feedback information of a mobile station considering adaptive feedback mode in a multi-cell wireless communication system comprises measuring a channel between the mobile station and a serving base station using a signal received from the serving base station; determining a first matrix indicating channel state information and a first precoder using the measured channel; generating a second matrix using a Fourier matrix and the first matrix; and transmitting feedback information including at least one of information of the first precoder and diagonal values of the second matrix to the serving base station.

In this case, the first precoder is a precoder selected among at least one precoder included in a first codebook by considering optimal performance of the mobile station.

Also, the first can be determined as Equation a below.

$$w_{opt} = \underset{w_k}{\operatorname{argmax}} |(w_k)^H R^3 w_k|^2 \quad \text{[Equation a]}$$

Where $w_k$ is an arbitrary precoder in the first codebook, $w_{opt}$ is the first precoder, and R is the first matrix, respectively.

Also, the second matrix can be determined as Equation b below.

$$\tilde{R} = F^H R F \quad \text{[Equation b]}$$

Where $\tilde{R}$ is the second matrix, F is a Fourier matrix, and R is the first matrix, respectively.

Also, the first matrix may be a correlation matrix, and wherein the second matrix may be an approximated diagonal matrix.

Further, the first codebook may be a base codebook.

To solve the aforementioned technical problems, according to one embodiment of the present invention a method for transmitting data of a base station considering adaptive feedback mode in a multi-cell wireless communication system comprises receiving feedback information including diagonal values of a second matrix and information of a first precoder from a mobile station; recovering a first matrix using the diagonal values; obtaining a second precoder using the recovered first matrix and the first precoder; and transmitting data precoded with the second precoder to the mobile station. Here, the second matrix can be determined by approximation using the first matrix and a Fourier matrix in the mobile station.

In this case, the first matrix can be recovered as Equation c below.

$$\tilde{\tilde{R}} = F \tilde{R} F^H \quad \text{[Equation c]}$$

Where $\tilde{\tilde{R}}$ is the recovered first matrix, F is a Fourier matrix, and $\tilde{R}$ is an approximated second matrix including the diagonal values, respectively.

Also, the second precoder can be obtained as Equation d below.

$$\hat{w} = \frac{Rw}{\|Rw\|} \quad \text{[Equation d]}$$

Where w is the first precoder, R is the recovered first matrix and $\hat{W}$ is the second precoder, respectively.

Also, the first precoder can be determined by the mobile station, by considering optimal performance of the mobile station under a channel state between the mobile station and the base station.

Also, the first precoder may be a precoder included in a base codebook, and the second precoder may be a precoder included in a transformed codebook for the adaptive feedback mode.

Further, the first matrix may be a correlation matrix, and wherein the second matrix may be an approximated diagonal matrix.

To solve the aforementioned technical problems, according to another embodiment of the present invention, a mobile station that supports codebook based adaptive feedback mode in a multi-cell wireless communication system comprises a processor; and a radio frequency (RF) module for transmitting and receiving a radio signal to and from the outside under the control of the processor. Here, the processor can be configured to measure a channel between the mobile station and a serving base station using a signal received from the serving base station; determine a first matrix indicating channel state information and a first precoder using the measured channel; generate a second matrix using a Fourier matrix and the first matrix; and control the RF module to transmit feedback information including at least one of information of the first precoder and diagonal values of the second matrix to the serving base station.

In this case, the processor may determine the first precoder among at least one precoder included in a first codebook by considering optimal performance of the mobile station.

Also, the processor may determine the first precoder as Equation a below.

$$w_{opt} = \underset{w_k}{\operatorname{argmax}} |(w_k)^H R^3 w_k|^2 \quad \text{[Equation a]}$$

Where $w_k$ is an arbitrary precoder in the first codebook, $w_{opt}$ is the first precoder, and R is the first matrix, respectively.

Also, the processor may determine the second precoder as Equation b below.

$$\tilde{R} = F^H R F \quad \text{[Equation b]}$$

Where $\tilde{R}$ is the second matrix, F is a Fourier matrix, and R is the first matrix, respectively.

Also, the first matrix may be a correlation matrix, and wherein the second matrix may be an approximated diagonal matrix.

Further, the first codebook may be a base codebook.

Advantageous Effects

According to the embodiments of the present invention, the following advantages can be obtained.

First, correlation matrix feedback can be carried out with low overhead by transmitting only the diagonal values of the correlation matrix.

Second, signaling overhead for correlation matrix feedback in adaptive feedback mode is reduced.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Figure 1:
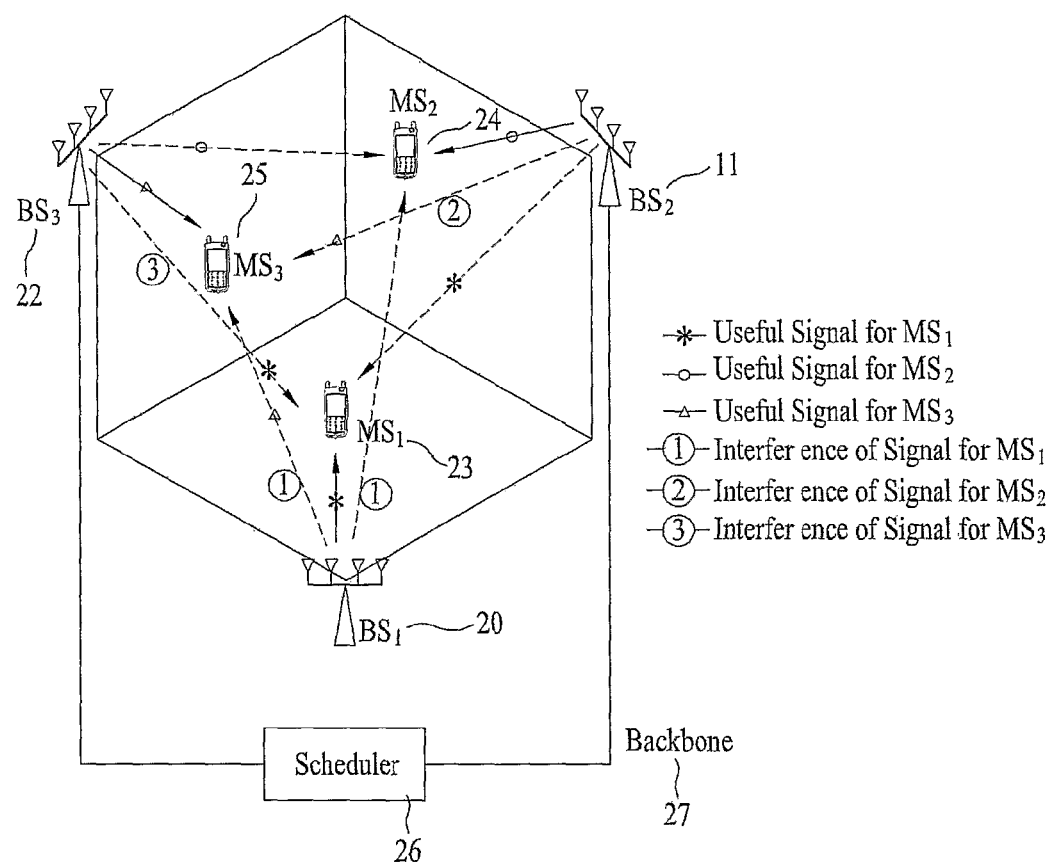
FIG. 1 illustrates signal transmission and reception considering potential interference in a communication system having a multi-cell environment.

The present invention relates a wireless access system. Hereinafter, methods of feedback for a mobile station in accordance with the embodiments of the present invention will be described.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a terminal.

Furthermore, a transmitter means a fixed and/or mobile node that transmits data service or voice service, and a receiver means a fixed and/or mobile node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station include a personal digital assistant (PDA), a hand-held PC, a notebook PC, a smart phone, and a multi mode-multi band (MM-MB) terminal.

In this case, the smart phone means a terminal having advantages of a mobile communication terminal and a personal mobile terminal in combination. Namely, the smart phone can mean a terminal that data communication functions such as schedule management, facsimile transmission and reception, and Internet access, which correspond to functions of the personal mobile terminal, are added to the mobile communication terminal. Also, the multi mode-multi band terminal means a mobile terminal having a multi-modem chip to be operated in a portable Internet system and other mobile communication systems (for example, code division multiple access (CDMA) 2000 system, WCDMA system, etc.).

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Hereinafter, the preferred embodiments according to the present invention will be described in detail with reference to the accompanying drawings. It is to be understood that the detailed description which will be disclosed together with the accompanying drawings is intended to describe exemplary embodiments of the present invention and is not intended to describe unique embodiments by which the present invention can be carried.

Furthermore, specific terminologies hereinafter described are provided to assist understanding of the present invention, and various modifications can be made in the specific terminologies within the range that they do not depart from technical spirits of the present invention.

FIG. 1 illustrates the concept of potential interference in signal transmission and reception of a communication system having a multi-cell environment.

When a plurality of base stations located in two or more cell regions transmit signals to one mobile station, interference may occur in a mobile station in one cell due to signals transmitted to mobile stations in other cells, as shown in FIG. 1.

Referring to FIG. 1, mobile stations ($MS_1$, $MS_2$, and $MS_3$) 23, 24, and 25 receive signals from base stations ($BS_1$, $BS_2$, and $BS_3$) 20, 21, and 22. A signal ① transmitted from the base station 20 to the mobile stations 24 and 25 may create interference with respect to the mobile station 23. A signal ② transmitted from the base station 21 to the mobile station 25 may create interference with respect to the mobile station 24. Similarly, a signal CD transmitted from the base station 22 to the mobile station ③ may create interference with respect to the mobile station 25.

Hereinafter, CSI feedback scheme will be described.

Implicit recommended transmission properties (e.g., CQI/PMI/RI) feedback and explicit CSI (Channel State Information) feedback are two representative feedback schemes, in which CSI feedback is categorized into quantization CSI feedback and analogue CSI feedback.

Channel matrix H or correlation matrix R could be the feedback information in the CSI case. For more efficient transmission, noise variance (e.g., interference level) is transmitted to the eNB together with channel matrix H or covariance matrix R.

Equation 1 represents a general expression of a spatial channel matrix.

$$h(k) = \begin{bmatrix} h_{1,1}(k) & h_{1,2}(k) & \ldots & h_{1,Nt}(k) \\ h_{2,1}(k) & h_{2,2}(k) & \ldots & h_{2,Nt}(k) \\ \vdots & \vdots & \ddots & \vdots \\ h_{Nr,1}(k) & h_{Nr,2}(k) & \ldots & h_{Nr,Nt}(k) \end{bmatrix} \quad \text{[equation 1]}$$

where h(k) is spatial channel matrix of cell k.

$h_{i,j}(k)$ is an element of channel matrix h(k).

which means a channel state of $i^{th}$ receive antenna and $j^{th}$ transmit antenna.

Nr is the number of receiver antenna.

Nt is the number of transmit antenna.

k is the index of cell.

Equation 2 below represents a general expression of a spatial channel correlation matrix.

$$R = E[h^H(k)h(k)] \quad \text{[equation 2]}$$

where,

R is spatial channel correlation matrix h(k) is spatial channel matrix of cell k E[ ] is 'mean' k is frequency index

The spatial channel correlation matrix of equation can be expressed as equation 3 below.

Equation 3 represents another expression of a spatial channel correlation matrix.

$$R(k) = \begin{bmatrix} r_{1,1}(k) & r_{1,2}(k) & \ldots & r_{1,Nt}(k) \\ r_{2,1}(k) & r_{2,2}(k) & \ldots & r_{2,Nt}(k) \\ \vdots & \vdots & \ddots & \vdots \\ r_{Nt,1}(k) & r_{Nt,2}(k) & \ldots & r_{Nt,Nt}(k) \end{bmatrix} \quad \text{[equation 3]}$$

where Nt is the number of transmit antennas.

In a case where every component of the correlation matrix is included in the feedback information, the size of the feedback information will be Nt×Nt bits or 2(Nt×Nt) bits if 1 bit quantization scheme or 2 bit quantization scheme for one component of channel correlation matrix is adopted. Then, it may cause a significant signalling overhead for the MSs.

Assume that there are 8 antennas in the BS side. Thus the correlation matrix with the size of 8*8 can be expressed as Equation 4.

$$R(k) = \begin{bmatrix} r_{1,1}(k) & r_{1,2}(k) & \ldots & r_{1,8}(k) \\ r_{2,1}(k) & r_{2,2}(k) & \ldots & r_{2,8}(k) \\ \vdots & \vdots & \ddots & \vdots \\ r_{8,1}(k) & r_{8,2}(k) & \ldots & r_{8,8}(k) \end{bmatrix} \quad \text{[equation 4]}$$

As seen from the equation 4, the 8*8 sized correlation matrix includes 64 components. Therefore, 64 bits or 128 bits may be required for the feedback information. Even when the symmetric property of correlation matrix is applied, 36 bits or 72 bits will be fed back. The symmetric property may reduce the size of the feedback, but it is still a big amount of information for the feedback.

According to one embodiment of the present invention, only the diagonal components of a correlation matrix can be included in the feedback information.

In adaptive feedback mode of IEEE 802.16m system, both BS and MS may transform a predetermined base codebook to a transformed codebook using a correlation matrix. In adaptive mode, the codebook entity may be transformed by the long term CSI. The long term CSI can be calculated by averaging covariance matrix of the channel. The transformation for codebook of rank 1 may be carried out according to following equation 5.

Equation 5 represents a mathematical expression for the normalization of a precoder using a correlation matrix.

$$\hat{w}_k = \frac{Rw_k}{\|Rw_k\|} \quad \text{[equation 5]}$$

In equation 5, $w_k$ is an arbitrary precoder (PMI) in the base codebook and $\hat{w}_k$ is a normalized codebook obtained by using the correlation matrix. Thus on the BS side, both the PMI and the correlation matrix R are necessary for obtaining the normalized codebook. Similarly, the BS may recover a PMI of the base codebook with a PMI of the normalized codebook and the correlation matrix R.

On the MS side, an optimized precoder can be determined by solving the following equation 6.

Equation 6 represents a mathematical expression for obtaining an optimized precoder (PMI) in the MS side.

$$w_{opt} = \underset{w_k}{\mathrm{argmax}} |(Rw_k)^H H^H H(Rw_k)|^2 \quad \text{[equation 6]}$$

$$= \underset{w_k}{\mathrm{argmax}} |(w_k)^H R^3 w_k|^2$$

Here, $w_{opt}$ is the optimized precoder (PMI) in terms of MS's optimal performance and R is a correlation matrix.

$w_{opt}$ will be fed back to BS together with correlation matrix R.

The efficient feedback scheme of correlation matrix R with low overhead according to one embodiment of the present invention is introduced in the following description.

To reduce the size of feedback information, a fast fourier transform (FFT) matrix can be applied so that the approximate diagonal matrix is obtained as following equation 7.

Hereinafter, a FFT matrix will be described in brief.

A fast Fourier transform (FFT) is an efficient algorithm to compute the discrete Fourier transform (DFT) and its inverse. In mathematics, the DFT is a specific kind of Fourier transform. The DFT is represented by the Fourier Matrix whose components are complex numbers. By using properties of complex numbers and matrices a number of important properties of the discrete Fourier and fast Fourier transform are derived.

Equation 7 represents a mathematical expression for obtaining a diagonal matrix using FFT matrix according to one embodiment of the present invention.

$$F^H RF = \tilde{R}(k) = \begin{bmatrix} \tilde{r}_{1,1}(k) & \tilde{r}_{1,2}(k) & \cdots & \tilde{r}_{1,Nt}(k) \\ \tilde{r}_{2,1}(k) & \tilde{r}_{2,2}(k) & \cdots & \tilde{r}_{2,Nt}(k) \\ \vdots & \vdots & \ddots & \vdots \\ \tilde{r}_{Nt,1}(k) & \tilde{r}_{Nt,2}(k) & \cdots & \tilde{r}_{Nt,Nt}(k) \end{bmatrix}$$ [equation 7]

$$\begin{bmatrix} \lambda_{1,1}(k) & \sigma_{1,2}(k) & \cdots & \sigma_{1,Nt}(k) \\ \sigma_{2,1}(k) & \lambda_{2,2}(k) & \cdots & \sigma_{2,Nt}(k) \\ \vdots & \vdots & \ddots & \vdots \\ \sigma_{Nt,1}(k) & \sigma_{Nt,2}(k) & \cdots & \lambda_{Nt,Nt}(k) \end{bmatrix}$$

In equation 7, F is the Fourier matrix. $\sigma_{i,j}(k)$ is the transformed non-diagonal component with low amplitude, which could be omitted. In other words, when the calculation according to equation 7 is carried out, diagonal components of the $\tilde{R}(k)$ matrix are much larger than the off-diagonal components. For each row the diagonal component is larger than the sum of the absolute value of the off-diagonal components.

Therefore, only the diagonal values of $\tilde{R}(k)$ (i.e., $\lambda_{i,i}(k)$) will be fed back to BS side, which means that the respective feedback information size will be Nt bits or 2Nt bits if the 1 bit quantization scheme or 2 bit quantization scheme for one component of channel correlation matrix is adopted.

For instance, in the case of 8 Tx (Equation 4), the size of feedback information is reduced to ⅛ compared with the conventional scheme.

Therefore, the feedback signalling overhead can be significantly reduced, so that the MS operation can be more efficient.

On the BS side, when the BS receives feedback information including the diagonal components of $\tilde{R}(k)$, the inverse process for recovering the correlation matrix is done as following equation 8.

Equation 8 represents an operation of a BS for recovering the correlation matrix according to one embodiment of the present invention.

$$\tilde{\tilde{R}}(k) = F\tilde{R}(k)F^H = \begin{bmatrix} \tilde{\tilde{r}}_{1,1}(k) & \tilde{\tilde{r}}_{1,2}(k) & \cdots & \tilde{\tilde{r}}_{1,Nt}(k) \\ \tilde{\tilde{r}}_{2,1}(k) & \tilde{\tilde{r}}_{2,2}(k) & \cdots & \tilde{\tilde{r}}_{2,Nt}(k) \\ \vdots & \vdots & \ddots & \vdots \\ \tilde{\tilde{r}}_{Nt,1}(k) & \tilde{\tilde{r}}_{Nt,2}(k) & \cdots & \tilde{\tilde{r}}_{Nt,Nt}(k) \end{bmatrix}$$ [equation 8]

The obtained correlation matrix $\tilde{\tilde{R}}(k)$ used to get the transformed codebook according to Equation 5. Thus the transformed precoder $\hat{w}_k$ will be decided based on the other feedback information, i.e., PMI $w_{opt}$.

The above described scheme can also be applied to multi-cell environment.

Rank 1 codebook based closed-loop MIMO is also a promising mode for the multi-cell joint processing (CO-MIMO in IEEE 16m) since the cell-edge UEs are located where channel condition is bad. Thus if the correlation matrix R above is changed into the following matrix shown in Equation 9, the proposed scheme according to one embodiment of the present invention is also fit for the multi-cell case.

$$R_{multicell} = (H_{multicell})^H H_{multicell}$$ [equation 9]

where $H_{multicell}$ is given as following Equation 10.

$$H_{multicell} = [h_1 \quad h_2 \quad \cdots \quad h_K]$$ [equation 10]

$$h_k = \begin{bmatrix} h_{11}(k) & h_{12}(k) & \cdots & h_{1T_k}(k) \\ h_{21}(k) & h_{22}(k) & \cdots & h_{2T_k}(k) \\ \vdots & \vdots & \ddots & \vdots \\ h_{R1}(k) & h_{R2}(k) & \cdots & h_{RT_k}(k) \end{bmatrix}$$

In equation 10, it is assumed that there are K cells supporting the joint transmission and the cell k has $T_k$ transmit antennas. $h_k$ is the cell k channel matrix of a MS with R receiver antennas.

Accordingly, an MS can transmit information of $R_{multicell}$ to the serving BS with low overhead by generating an approximated correlation matrix and adding only the diagonal values of the approximated correlation matrix to the feedback information.

Figure 2:
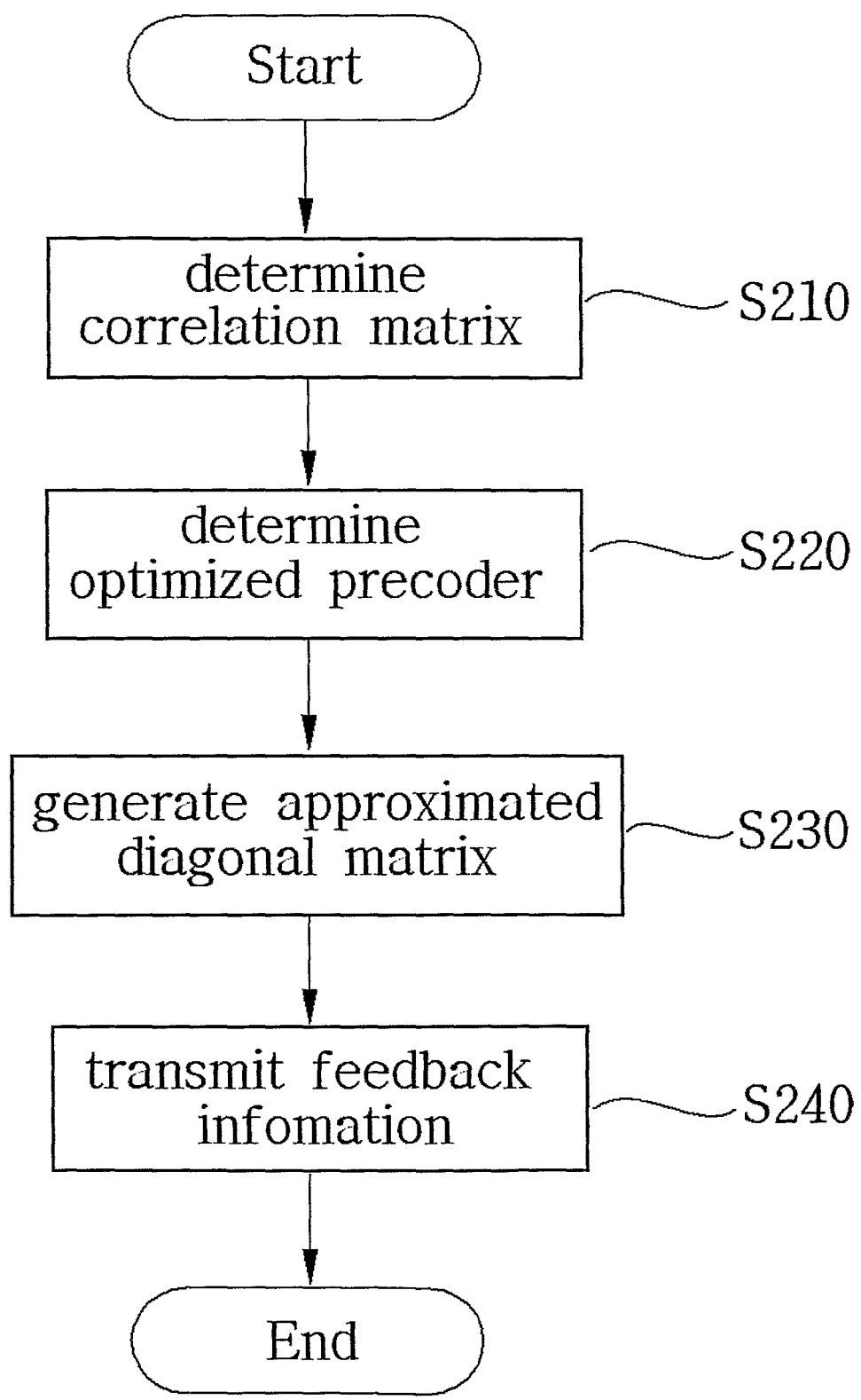
FIG. 2 is a flowchart illustrating an exemplary procedure for transmitting feedback information in adaptive feedback mode of an MS.

The above described feedback method will be re-explained referring to FIG. 2.

FIG. 2 is a flowchart illustrating an exemplary procedure for transmitting feedback information in adaptive feedback mode of an MS.

Referring to FIG. 2, an MS measures a channel between the MS and a serving BS using a signal received from the serving BS, then determines a correlation matrix using the measured channel in steps S210.

The MS determines an optimized precoder (PMI) in terms of the mobile station's performance by calculating above described Equation 6 in step S220.

The MS then generates an approximated diagonal matrix using a Fourier matrix and the correlation matrix by calculating above described Equation 7 in step S230.

The MS selects only the diagonal values of the approximated matrix and transmits the selected values to the serving BS along with the optimized precoder information as feedback information in step S240.

According to another embodiment of the present invention, a mobile station and base station (FBS, MBS), on which the above described embodiments of the resent invention can be performed, are explained as follows.

First of all, a mobile station works as a transmitter in uplink and is able to work as a receiver in downlink. A base station works as a receiver in uplink and is able to work as a transmitter in downlink. In particular, each of the mobile station and the base station can include a transmitter and a receiver for transmission of information and/or data.

Each of the transmitter and the receiver can include a processor, a module, a part and/or a means for performing embodiments of the present invention. In particular, each of the transmitter and the receiver can include a module (means) for encrypting a message, a module for interpreting the encrypted message, an antenna for transceiving the message and the like. Examples of these transmitting and receiving sides are explained with reference to FIG. 3 as follows.

Figure 3:
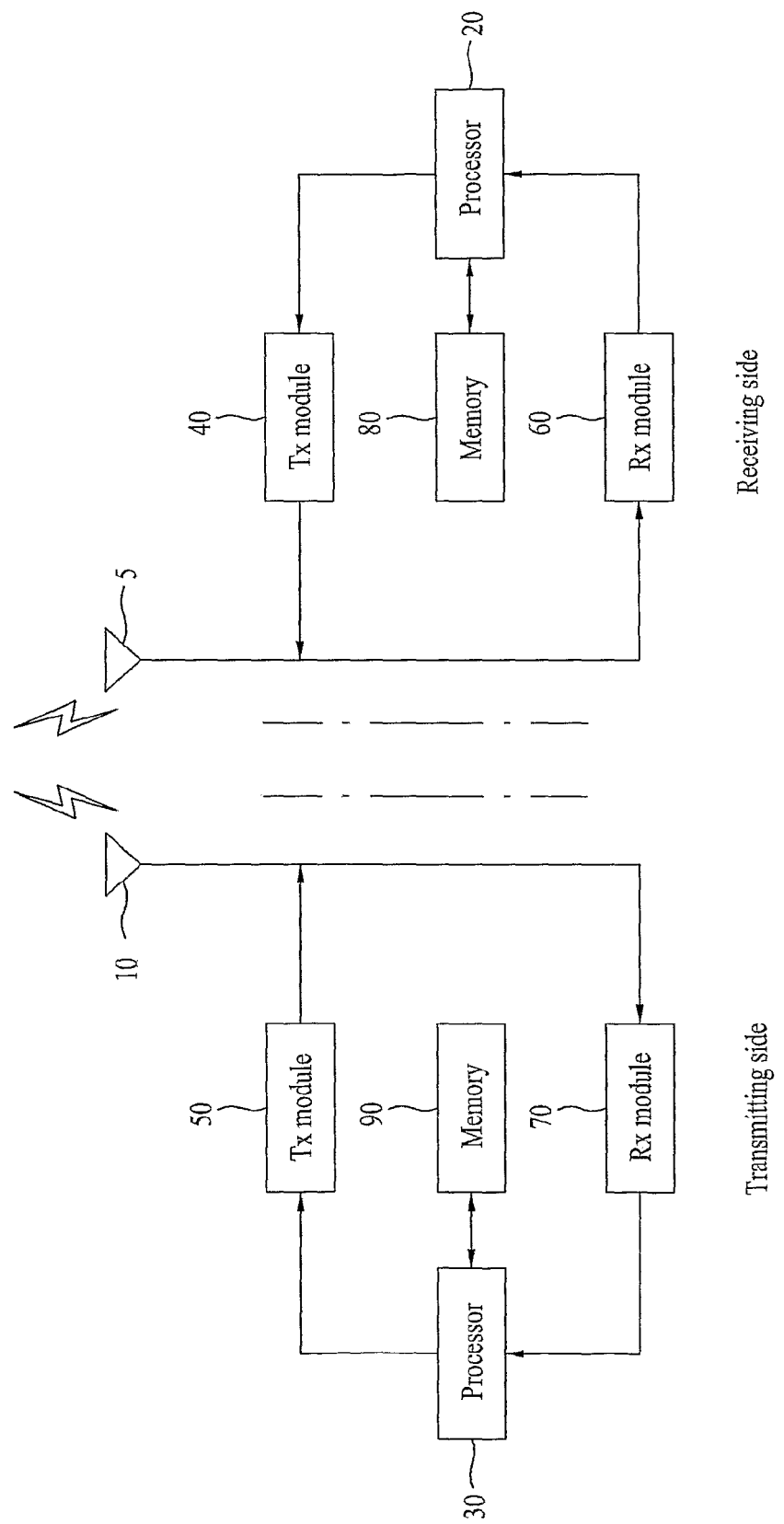
FIG. 3 is a block diagram for an example of a transmitting and receiving side structure according to another embodiment of the present invention.

FIG. 3 is a block diagram for an example of a transmitting and receiving side structure according to another embodiment of the present invention.

Referring to FIG. 3, a left side shows a structure of a transmitting side and a right side shows a structure of a receiving side. The transmitting/receiving side can include an antenna 5/10. a processor 20/30, a transmitting (Tx) module 40/50, a receiving (Rx) module 60/70 and a memory 80/90. Each of the elements can perform a corresponding function. The respective elements are explained in detail as follows.

First of all, the antenna 5/10 performs a function of transmitting a signal generated by the Tx module 40/50 externally or a function of receiving a radio signal externally and then delivering the received radio signal to the Rx module 60/70. If MIMO function is supported, at least two antennas can be provided.

The antenna, Tx module and Rx module can configure a radio communication (RF) module.

The processor 20/30 basically controls overall operations of components of the transmitting side and receiving side. For example, the processor is able to control the processes of above-described correlation matrix feedback method according to one embodiment of the present invention.

In particular, the processor of a mobile station is able to measure a channel between the mobile station and a serving BS using a signal received from the serving BS by controlling the RF module.

Then, the processor determines a correlation matrix and an optimized precoder in terms of the mobile station's performance using the measured channel by calculating above described Equation 2 and Equation 6, respectively. In order to reduce signaling overhead, the processor generates an approximated diagonal matrix using a Fourier matrix and the correlation matrix by calculating above described Equation 7.

The processor then selects only the diagonal values of the approximated matrix and transmits the selected values to the serving base station as feedback information. Here, the above-determined optimized precoder (PMI) can also be transmitted to the serving base station along with the diagonal values.

Meanwhile, the processor of the base station may perform inverse processing as Equation 8 to recover the correlation matrix which was determined by the mobile station using the feedback information received from the mobile station. Then, the processor may obtain a transformed precoder for adaptive feedback mode by using the recovered correlation matrix and the optimized precoder. Then the processor is able to control data transmission to the mobile station to be carried out using the transformed precoder for the optimized performance of the mobile station.

The Tx module 40/50 performs prescribed coding and modulation on data, which is scheduled to be externally transmitted by the processor 20/30, and is then able to deliver the coded and modulated data to the antenna 10/5.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data (e.g., sleep mode information according to reference synchronization information, etc.). Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

The invention claimed is:

1. A method for transmitting correlation matrix feedback information of a mobile station considering adaptive feedback mode in a multi-cell wireless communication system, the method comprising:

measuring a channel between the mobile station and a serving base station using a signal received from the serving base station;

determining a first matrix indicating channel state information and a first precoder using the measured channel;

generating a second matrix using a Fourier matrix and the first matrix;

transmitting feedback information including information of the first precoder and diagonal values of the second matrix to the serving base station; and receiving data precoded with a second precoder from the serving base station, wherein the second precoder is obtained based on the first precoder and the diagonal values of the second matrix.

2. The method according to claim 1, wherein the first precoder is a precoder selected among at least one precoder included in a first codebook by considering optimal performance of the mobile station.

3. The method according to claim 2, wherein the first precoder is determined as Equation a below:

$$w_{opt} = \mathop{\mathrm{argmax}}_{w_k} |(w_k)^H R^3 w_k|^2 \qquad \text{[Equation a]}$$

Where $w_k$ is an arbitrary precoder in the first codebook, $w_{opt}$ is the first precoder, and R is the first matrix, respectively.

4. The method according to claim 1, wherein the second matrix is determined as Equation b below:

$$\tilde{R} = F^H R F \qquad \text{[Equation b]}$$

Where $\tilde{R}$ is the second matrix, F is a Fourier matrix, and R is the first matrix, respectively.

5. The method according to claim 1, wherein the first matrix is a correlation matrix, and wherein the second matrix is an approximated diagonal matrix.

6. The method according to claim 1, wherein the first codebook is a base codebook.

7. A method for transmitting data of a base station considering adaptive feedback mode in a multi-cell wireless communication system, the method comprising:
receiving feedback information including diagonal values of a second matrix and information of a first precoder from a mobile station;
recovering a first matrix using the diagonal values;
obtaining a second precoder using the recovered first matrix and the first precoder; and
transmitting data precoded with the second precoder to the mobile station,
wherein the second matrix is determined by approximation using the first matrix and a Fourier matrix in the mobile station.

8. The method according to claim 7, wherein the first matrix is recovered as Equation c below:

$$\tilde{\tilde{R}}=F\tilde{R}F^H \quad \text{[Equation c]}$$

Where $\tilde{\tilde{R}}$ is the recovered first matrix, F is a Fourier matrix, and $\tilde{R}$ is an approximated second matrix including the diagonal values, respectively.

9. The method according to claim 8, wherein the second precoder is obtained as Equation d below:

$$\hat{w}=\frac{Rw}{\|Rw\|} \quad \text{[Equation d]}$$

Where w is the first precoder, R is the recovered first matrix and $\hat{W}$ is the second precoder, respectively.

10. The method according to claim 8, wherein the first precoder is determined by the mobile station, by considering optimal performance of the mobile station under a channel state between the mobile station and the base station.

11. The method according to claim 10, wherein the first precoder is a precoder included in a base codebook, and wherein the second precoder is a precoder included in a transformed codebook for the adaptive feedback mode.

12. The method according to claim 7, wherein the first matrix is a correlation matrix, and wherein the second matrix is an approximated diagonal matrix.

13. A mobile station that supports codebook based adaptive feedback mode in a multi-cell wireless communication system, the mobile station comprising:
a processor; and
a radio frequency (RF) module for transmitting and receiving a radio signal to and from the outside under the control of the processor,
wherein the processor is configured to:
measure a channel between the mobile station and a serving base station using a signal received from the serving base station;
determine a first matrix indicating channel state information and a first precoder using the measured channel;
generate a second matrix using a Fourier matrix and the first matrix; and
control the RF module to transmit feedback information including information of the first precoder and diagonal values of the second matrix to the serving base station and to receive data precoded with a second precoder from the serving base station,
wherein the second precoder is obtained based on the first precoder and the diagonal values of the second matrix.

14. A mobile station according to claim 13, wherein the processor determines the first precoder among at least one precoder included in a first codebook by considering optimal performance of the mobile station.

15. A mobile station according to claim 14, wherein the processor determines the first precoder as Equation a below:

$$w_{opt}=\underset{w_k}{\operatorname{argmax}}|(w_k)^H R^3 w_k|^2 \quad \text{[Equation a]}$$

Where $w_k$ is an arbitrary precoder in the first codebook, $w_{opt}$ is the first precoder, and R is the first matrix, respectively.

16. A mobile station according to claim 13, wherein the processor determines the second precoder as Equation b below:

$$\tilde{R}=F^H RF \quad \text{[Equation b]}$$

Where $\tilde{R}$ is the second matrix, F is a Fourier matrix, and R is the first matrix, respectively.

17. A mobile station according to claim 13, wherein the first matrix is a correlation matrix, and wherein the second matrix is an approximated diagonal matrix.

18. A mobile station according to claim 13, wherein the first codebook is a base codebook.

* * * * *